(12) United States Patent
Bottome

(10) Patent No.: US 9,200,595 B2
(45) Date of Patent: Dec. 1, 2015

(54) NOSE CONE ASSEMBLY

(75) Inventor: Kristofer J. Bottome, Nottingham (GB)

(73) Assignee: ROLLS-ROYCE PLC, London (GB)

( * ) Notice: Subject to any disclaimer, the term of this patent is extended or adjusted under 35 U.S.C. 154(b) by 959 days.

(21) Appl. No.: 13/290,563

(22) Filed: Nov. 7, 2011

(65) Prior Publication Data

US 2012/0134844 A1 May 31, 2012

(30) Foreign Application Priority Data

Nov. 30, 2010 (GB) .................................. 1020213.3

(51) Int. Cl.
*F03D 1/06* (2006.01)
*F02K 3/06* (2006.01)
*B64C 11/14* (2006.01)
*F02C 7/04* (2006.01)

(52) U.S. Cl.
CPC . *F02K 3/06* (2013.01); *B64C 11/14* (2013.01); *F02C 7/04* (2013.01); *F03D 1/0691* (2013.01); *F05B 2280/5001* (2013.01); *F05D 2300/501* (2013.01)

(58) Field of Classification Search
CPC ..... F03D 1/065; F03D 1/0666; F03D 1/0691; Y10S 416/50; B64C 11/14; F01D 25/243
USPC ................ 416/93 R, 94, 245 R, 500
See application file for complete search history.

(56) References Cited

U.S. PATENT DOCUMENTS

| 3,990,814 | A | * | 11/1976 | Leone | 416/245 R |
|---|---|---|---|---|---|
| 4,598,544 | A | * | 7/1986 | Williams et al. | 60/226.2 |
| 4,863,354 | A | * | 9/1989 | Asselin et al. | 416/245 R |
| 5,833,435 | A | * | 11/1998 | Smith | 416/94 |
| 6,416,280 | B1 | | 7/2002 | Forrester et al. | |
| 6,447,255 | B1 | * | 9/2002 | Bagnall et al. | 416/245 R |
| 6,561,763 | B2 | * | 5/2003 | Breakwell | 416/94 |
| 6,942,462 | B2 | * | 9/2005 | Breakwell et al. | 416/245 R |
| 2008/0022524 | A1 | | 1/2008 | Schreiber | |
| 2009/0214354 | A1 | * | 8/2009 | Bagnall | 416/245 R |
| 2009/0269202 | A1 | * | 10/2009 | Borzakian et al. | 416/220 R |
| 2010/0051112 | A1 | | 3/2010 | Dieling | |

(Continued)

FOREIGN PATENT DOCUMENTS

| EP | 1 016 588 A3 | 7/2000 |
|---|---|---|
| EP | 2 096 029 A2 | 9/2009 |

(Continued)

OTHER PUBLICATIONS

British Search Report dated Feb. 23, 2011 issued in British Patent Application No. 1020213.3.

*Primary Examiner* — Nathaniel Wiehe
*Assistant Examiner* — Sean J Younger
(74) *Attorney, Agent, or Firm* — Oliff PLC

(57) ABSTRACT

A nose cone assembly 102 is disclosed, comprising a one piece nose cone 104 and a support ring 106 on which the nose cone 104 is mounted. The support ring 106 comprises a plurality of circumferentially distributed resilient attachment tabs 114, via which the nose cone 104 is mounted on the support ring 106. The support ring 106 further comprises a load spreader 122, and each of the resilient attachment tabs 114 is operably connected to the load spreader 122, such that deflections and forces experienced by any one attachment tab 114 are distributed to other attachment tabs 114 via the load spreader 122.

18 Claims, 5 Drawing Sheets

(56) References Cited

U.S. PATENT DOCUMENTS

2010/0215507 A1* 8/2010 Breakwell ................. 416/244 A
2010/0258199 A1* 10/2010 Schreiber ..................... 137/15.1

FOREIGN PATENT DOCUMENTS

| GB | 2 363 170 A | 12/2001 |
| GB | 2 364 748 A | 2/2002 |

* cited by examiner

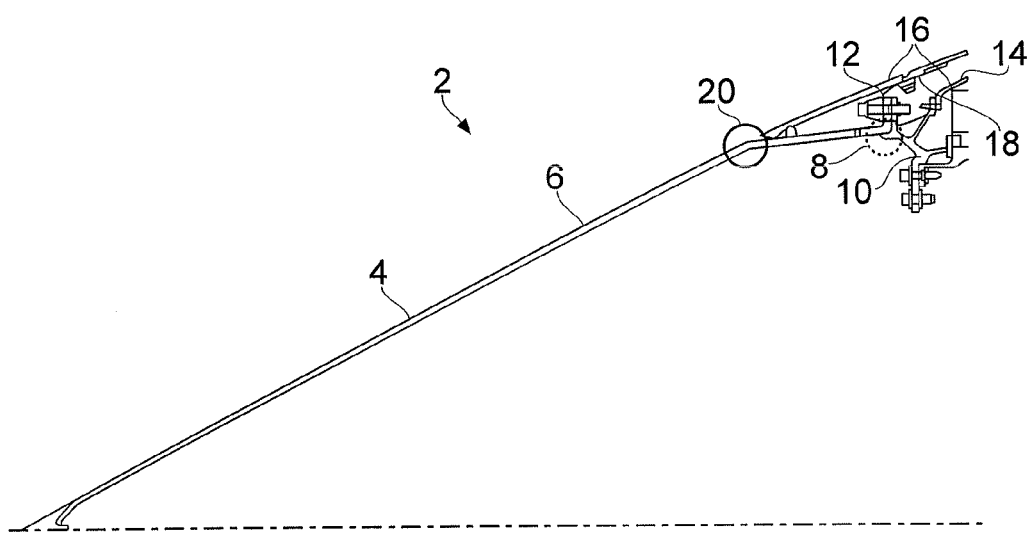
FIG. 1 --Related Art
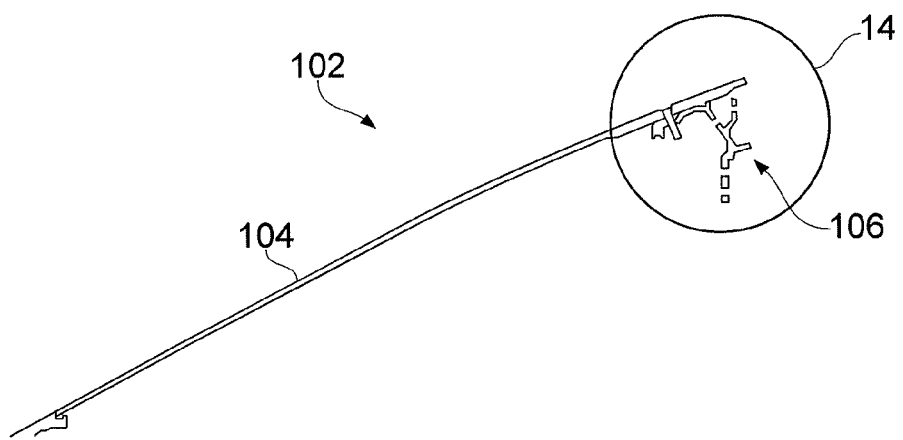
FIG. 2

NOSE CONE ASSEMBLY

The present invention relates to a nose cone assembly for a gas tubine engine.

BACKGROUND

A nose cone assembly is typically found at the intake of a gas turbine engine. The assembly conventionally comprises a one or two piece nose cone mounted on a support ring that is in turn fixed to the fan disk. The purpose of the nose cone assembly is to provide smooth inflow of air to the fan blades and to protect the rest of the engine from damage that could be caused by a foreign body impact such as a bird strike.

A typical two piece nose cone assembly 2 is illustrated in FIG. 1. The nose cone 4 comprises a woven glass fibre fabric pre-impregnated with an epoxy based resin and is manufactured using a hand lay-up technique. The thickness of the nose cone 4 and the cone angle are determined by the required impact behaviour. The thickness of the nose cone 4 is determined empirically based on impact test experience and increases with radius. The angle of the nose cone 4 is determined according to both impact behaviour and the necessity to avoid ice build up on the surface of the nose cone 4. The outer surfaces 6 of the nose cone 4 are coated with polyurethane for erosion resistance on top of an epoxy based paint. A white spiral is painted onto the nose cone 4. Typically, the nose cone 4 is radially located using a spigot fit 8 onto an aluminium support ring 10 and is axially located using a bolted flange 12 that mates with a corresponding flange 14 on the support ring 10. The nose cone 4 is a rotationally balanced component and is circumferentially timed using dowels. Any additional component balancing is achieved using steel putty. The second piece of the nose cone assembly is the fairing 16 that maintains the annulus line between the nose cone 4 and an adjacent annulus filler (not shown). The fairing 16 is typically made from the same composite material as the nose cone 4. Countersunk screws locate the fairing onto to discrete brackets 18 that are attached to the main nose cone support ring flange 14. The rear of the fairing 16 provides a support location for the leading edge of the annulus filler (not shown). The fairing 16 is painted and coated for erosion protection in the same manner as the nose cone 4. A leading edge seal is fixed to the nose cone 4 to prevent fairing vibration.

In the event of a foreign body impact, such as a bird strike, all of the impact forces are carried by the nose cone 4. Deflections into the support ring 10 could cause undesirable strains in the support ring and are thus minimised as far as possible. The connection between the nose cone 4 and the support ring 10 is highly rigid, ensuring any deflection caused in the nose cone 10 is limited to remain forward of the change in cone angle, illustrated at 20 in FIG. 1, and is not passed to the support ring 10.

In order to simplify the manufacturing process, attempts have been made to design one piece nose cone assemblies, such as for example those disclosed and illustrated in US200810022524 and U.S. Pat. No. 6,416,280. These one piece nose cones may be attached to the support ring by angled or pocketed screws that engage the support ring flange. However, in order to ensure the necessary rigidity in the connection between nose cone and support ring, such one piece designs require comparatively thick ring sections to impart the necessary stiffness. Particularly in a large nose cone assembly, such increased thickness carries a heavy weight penalty. In addition, manufacturing issues can arise with such thick sections in a composite material, including issues with inadequate wetting, induced thermal and cure shrinkage stresses, internal cracking and delamination. However, if the thickness of the attachment sections were reduced, then high deflections would be experienced within the nose cone and passed to the support ring. Following impact with a large bird, such deflections would be sufficiently high to raise concerns over excessive strains in the support ring that could lead to failure. It is therefore desirable to provide a lightweight nose cone assembly that is nonetheless highly impact resistant.

SUMMARY OF INVENTION

According to the present invention, there is provided a nose cone assembly comprising a nose cone and a support ring on which the nose cone is mounted; wherein the support ring comprises a plurality of circumferentially distributed resilient attachment tabs, via which the nose cone is mounted on the support ring, the support ring further comprising a load spreader, each of the resilient attachment tabs being operably connected to the load spreader.

The present invention thus provides a one piece nose cone assembly that can be light weight but is nonetheless highly impact resistant. This is achieved by replacing the existing nose cone and support ring arrangement with two new components designed to work together as a flexible system. Instead of carrying all impact forces through the nose cone, and imposing a heavy rigid connection between nose cone and support ring, the present invention allows deflection to be distributed throughout certain features of the support ring, sharing the loads experienced such that strains remain below the necessary levels to ensure component integrity.

A conical surface of the nose cone may be mounted directly onto the resilient attachment tabs. In this manner the need for heavy mating flanges on the nose cone and support ring is dispensed with, simplifying construction of the nose cone in particular, and avoiding the issues specific to construction of thick composite sections.

The resilient attachment tabs may be flexible. The attachment tabs may thus accommodate manufacturing and machining tolerances without causing damage to the nose cone itself.

Each resilient attachment tab may comprise a nut, which may be operable to receive a bolt. The resilient attachment tabs may thus each be individually bolted to the conical surface of the nose cone. The bolts may be countersunk and may be positioned perpendicular to the annular surface in order to maintain aerodynamic efficiency.

The resilient attachment tabs may project from a continuous annular shoulder on the support ring. The resilient attachment tabs may project in a forward direction, towards the nose of the nose cone.

An internal conical surface of the nose cone may comprise a spigot, which may be operable to be received on the annular shoulder of the support ring.

The shoulder may be defined between radial and axial location walls, thus providing both radial and axial location of the nose cone on the support ring.

The load spreader of the support ring may comprise a ring and may for example comprise a sprung metallic ring. Alternatively, the load spreader may comprise a carbon or glass fibre disc.

Each of the resilient attachment tabs may comprise a recess at a free end thereof, and the load spreader may be received in the plurality of recesses.

The load spreader may be received in the recesses with some play, such that the free end of each resilient attachment tab may displace a predetermined distance before engaging on the load spreader.

The load spreader may comprise an annular slotted flange formed on the support ring.

The nose cone may comprise a composite material and the support ring may comprise a metallic material.

The nose cone may comprise a filament wound glass fibre structure, a filament wound carbon fibre structure or a filament wound glass fibre and carbon fibre structure.

According to another aspect of the present invention, there is provided a gas turbine engine having a nose cone assembly of the first aspect of the present invention.

BRIEF DESCRIPTION OF THE DRAWINGS

For a better understanding of the present invention, and to show more clearly how it may be carried into effect, reference will now be made, by way of example, to the following drawings, in which:—

FIG. 1 is a sectional view of a nose cone assembly according to the prior art.

FIG. 2 is a sectional view of a nose cone assembly according to the present invention.

DETAILED DESCRIPTION OF EMBODIMENTS

Figure 3:
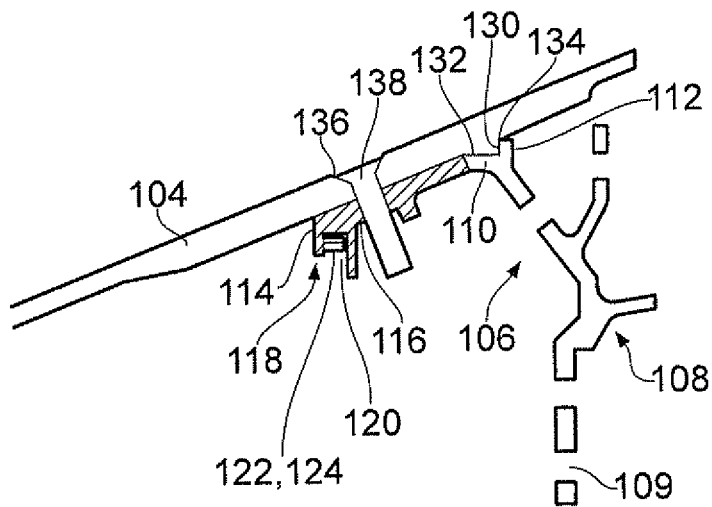
FIG. 3 is an exploded view of region A in FIG. 2.
Figure 4:
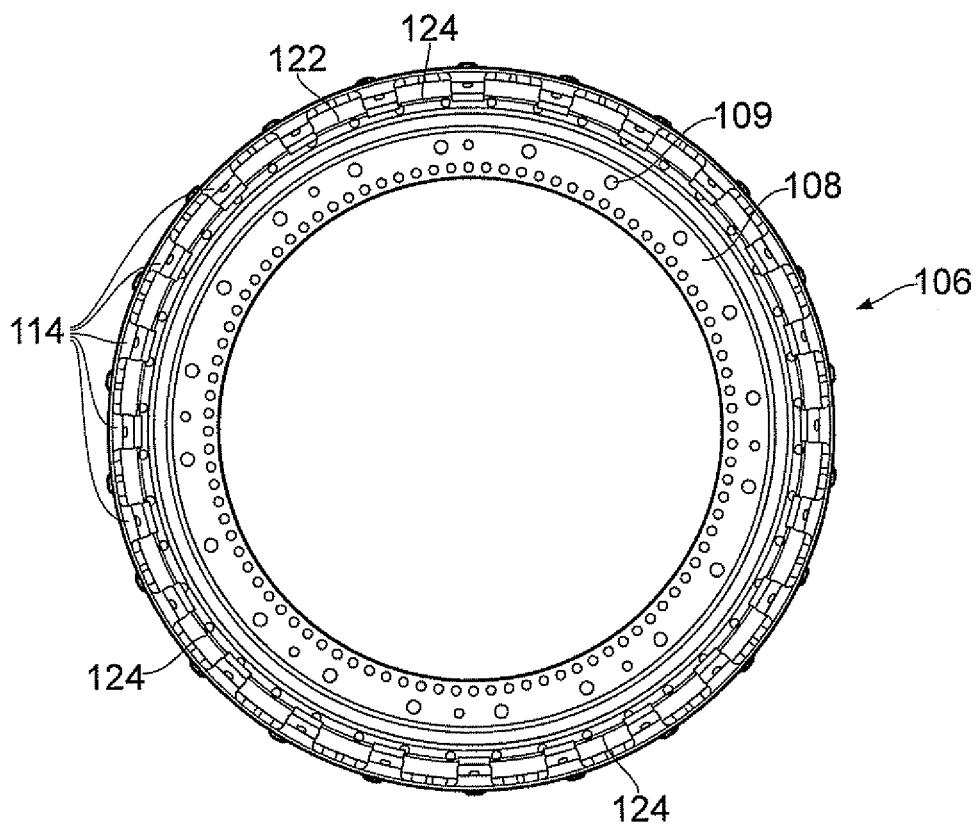
FIG. 4 is a side view of a support ring.
Figure 5:
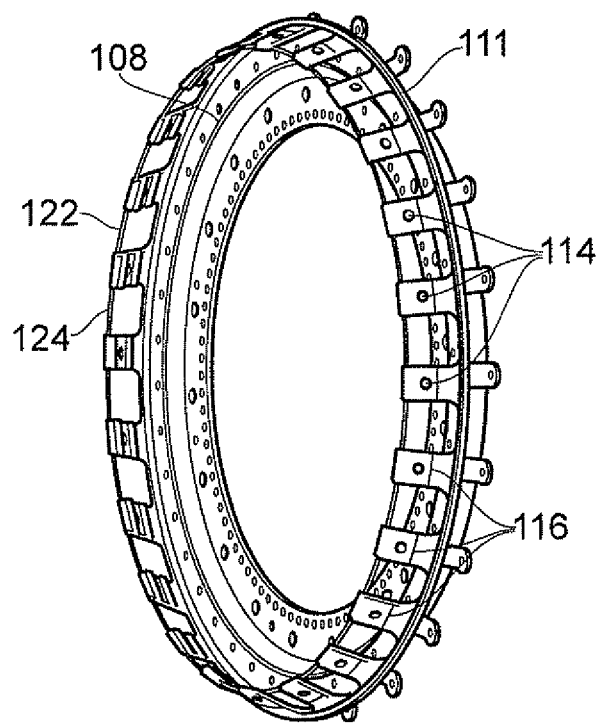
FIG. 5 is a perspective view of a support ring.

With reference to FIGS. 2 and 3, a nose cone assembly 102 according to the present invention comprises a one piece nose cone 104 and a support ring 106. An exemplary nose cone 104 is formed by filament winding from a 50/50 ratio by weight of S-2 Glass®, e.g. 449-AA-1250, 406 Tex (g/1000 m) and Carbon fibre e.g. HTA5131 6k with an epoxy resin system such as Hexcel® RTM6 resin. This system may also be used with a pre-impregnated glass fibre cone. The support ring 106 may be machined from a one piece aluminium alloy (RR57) class 2 forging and sulphuric anodised all over. However, other materials such as Titanium, Carbon Fibre and stainless steels may also be used.

The support ring 106 comprises an annular main body 108 that is operable for substantially rigid connection to adjacent components, including for example a fan disc and an annulus filler (not shown). The main body 108 may comprise openings 109 at a radially inner end of the main body 108 and other attachment features as illustrated. The main body 108 comprises a continuous annular shoulder 111 defined between a radial supporting wall 110 and an axial supporting wall 112. The continuous annular shoulder 111 is at a radially outer end of the main body 108 of the support ring 106. The annular shoulder is oriented so as to open towards a forward direction of the support ring 106, when the support ring 106 is oriented in its operating position within a gas turbine engine. The forward direction is from right to left in the Figures. Projecting from the main body 108, in the region of the annular shoulder 111 is a plurality of resilient attachment tabs in the form of flexible fingers 114. The flexible fingers 114 project in a forward direction from the main body 108 of the support ring 106. Each flexible finger 114 comprises an opening 116 extending through the flexible finger in a radial direction. Each opening 116 is defined by a shank nut that is retained within the flexible finger 114. The shank nut may be sized to accept and engage with, for example, 0.7938 cm (0.3125") bolts.

The free end 118 of each flexible finger 114 comprises a machined recess 120. The free end 118 of each flexible finger 114 is at the forward end of the flexible finger 114 and the free end 188 of each flexible finger 114 is positioned radially inwardly of the point from which each flexible finger 114 projects from the main body 108 of the support ring 106. Each recess 120 opens radially inwardly of its respective flexible finger 114. A load spreader 122 in the form of a sprung steel ring 124 is received within the recesses 120 formed at the ends of the flexible fingers 114. Each recess 120 receives the spring 124 with a small degree of play, such that a finite amount of radial inward or outward displacement may be experienced by the free end of each flexible finger 114 before the inner walls of the recess 120 of the flexible finger engage on the spring 124.

The nose cone 104 comprises a thin, one piece conical shell. An annular ridge 130 defined between radial and axial locating walls 132, 134 extends around the inner circumference of the nose cone 104. In use, the ridge 130 is received in the shoulder 111 of the support ring 106. Respective radial and axial location walls on the ridge and shoulder engage, so as to define a dual spigot fit ensuring accurate radial and axial location of the nose cone 104 on the support ring 106.

A plurality of countersunk openings 136 extend radially through the nose cone 104 to admit a plurality of fixing bolts 138. Each fixing bolt 138 passes through an associated opening in the nose cone 104 and is received within the retained shank nut on the corresponding flexible finger 114. The bolts are positioned perpendicular to the annular surface of the nose cone, thus ensuring aerodynamic efficiency. With the annular ridge 130 of the nose cone 104 received in the annular shoulder 111 of the support ring 106, the openings 136 of the nose cone 104 are radially and axially aligned with the respective openings 116 on the flexible fingers. The circumferential location of the nose cone 104 on the support ring 106 may be timed using dowels (not shown) ensuring that the nose cone 104 may only be mounted on the support ring 106 in a single, balanced circumferential orientation. The play afforded by the flexibility of the flexible fingers 114 ensures that manufacturing and machining tolerances can be accommodated in ensuring secure attachment of the nose cone 104 to the support ring 106 without damage to the nose cone 104.

The nose cone assembly 102 of the present invention withstands an impact event such as a bird strike by managing the deflections and impact loads generated during such an event, distributing the forces experienced by the nose cone 104 during impact. In the event of a bird impact, a large deflection is produced in the nose cone 104 at the location of the impact. In contrast to existing nose cones, in which all deflection is constrained to remain forward of the change in cone angle, the nose cone 104 of the present invention permits the "deflection pocket" caused by the impact to travel, with the bird, up the nose cone 104 until it reaches the connection with the support ring 106. Some of the impact forces are then transferred to the support ring via the interacting annular ridge 130 and shoulder 111. In addition, the lightweight construction of the support ring 106 deflects to allow the deflection pocket to pass over it. Such deflection might ordinarily be expected to cause large plastic strains in the support ring that could ultimately result in failure of the support ring. For example, if the entire deflection was carried by a single flexible finger 114, the finger 114 might be expected to fail. However, each flexible finger 114 is operably connected to the steel spring 124, and this acts as a load distributer, or load spreader. The flexible fingers in the path of the deflection pocket deflect, taking up the play in the recesses 120, until they contact the steel spring 124. The spring 124 both absorbs impact energy in its deflection, and distributes the impact loads among many more of the flexible fingers than were directly in the impact deflection path. The load required to deflect the steel spring 124 is much higher than that required to deflect an individual flexible finger 114. This has the effect of reducing the load seen by the individual fingers 114. As the finger in contact with the ring deflects further, it presses on the ring, causing the ring to deform and absorb energy. As the ring 124 deforms, it presses on other flexible fingers, passing the load on to them and so distributing the load around the support ring 106. This action significantly reduces the load experienced by any one flexible finger 114, ensuring that the strains experienced in the support ring 106 at no stage exceed the maximum allowable strains for component integrity.

Figure 6:
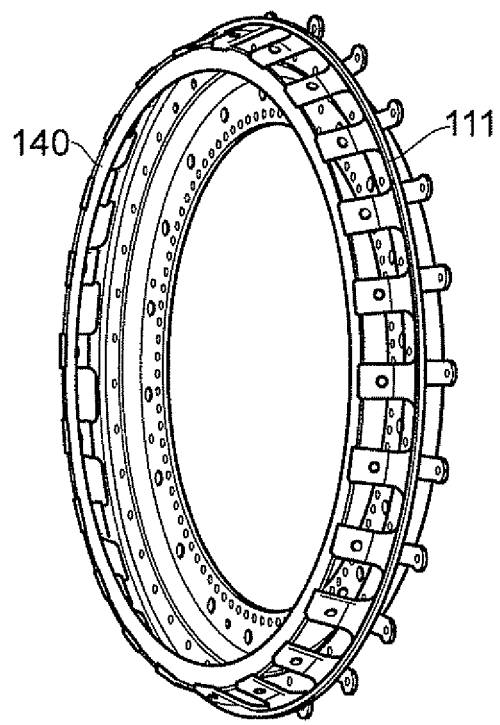
FIG. 6 is a perspective view of a support ring having an alternative load spreader.
Figure 7:
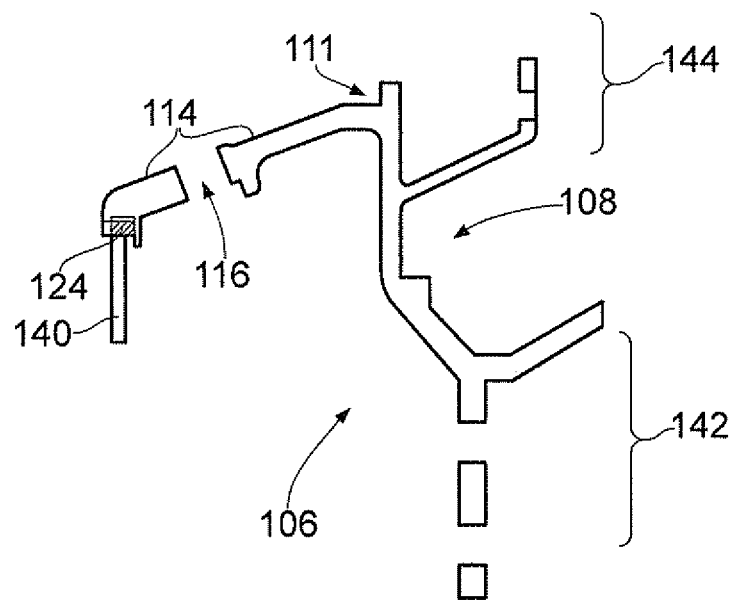
FIG. 7 is a detail view of a support ring.

In an alternative embodiment, illustrated in FIG. 6, the load spreader 122 may take the form of a carbon fibre or glass fibre disc 140, instead of the sprung steel ring 124. The disc 140 is relatively light weight but has significant depth, ensuring high I value and hence high stiffness to allow it to perform the load absorbing and distributing function described above. The two alternative forms of load spreader 122 are illustrated in FIG. 7, where the sprung steel ring 124 may be compared with the carbon or glass fibre disc 140, each being received in the plurality of recesses 120 defined at the free ends of the flexible fingers 114. It will be appreciated that all deflection and impact loads are carried by the forward (left) half of the support ring 106, allowing rigid connections to be made to the fan disc, at region 142 and to the annulus filler at region 144.

Figure 8:
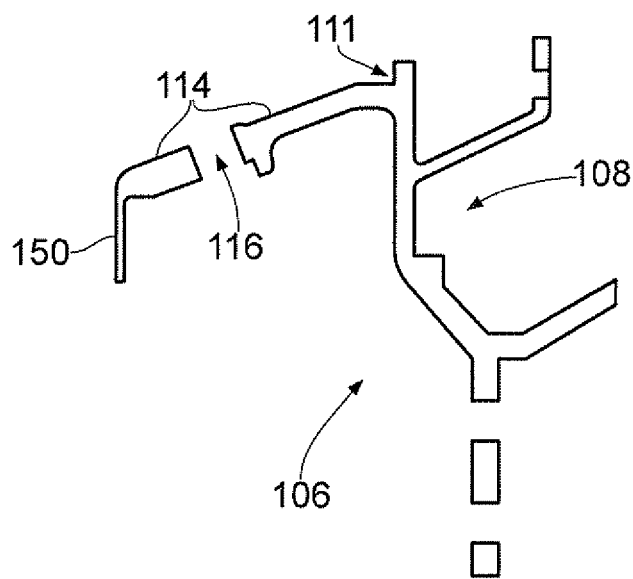
FIG. 8 is a detail view of an alternative support ring.
Figure 9:
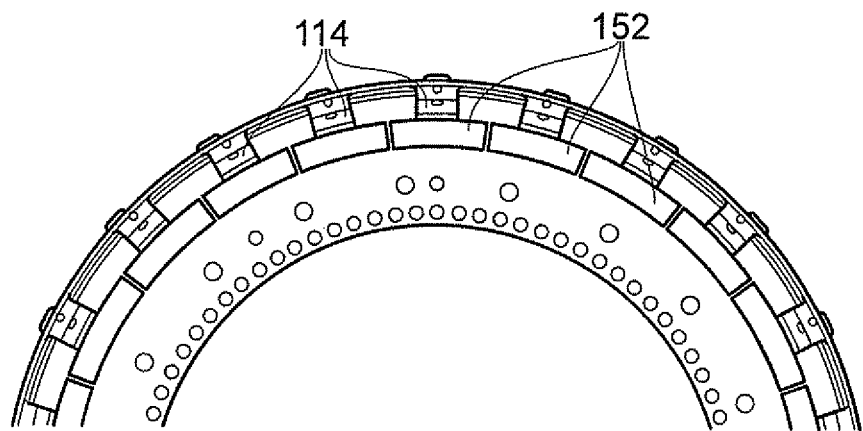
FIG. 9 is a partial side view of another alternative support ring.
Figure 10:
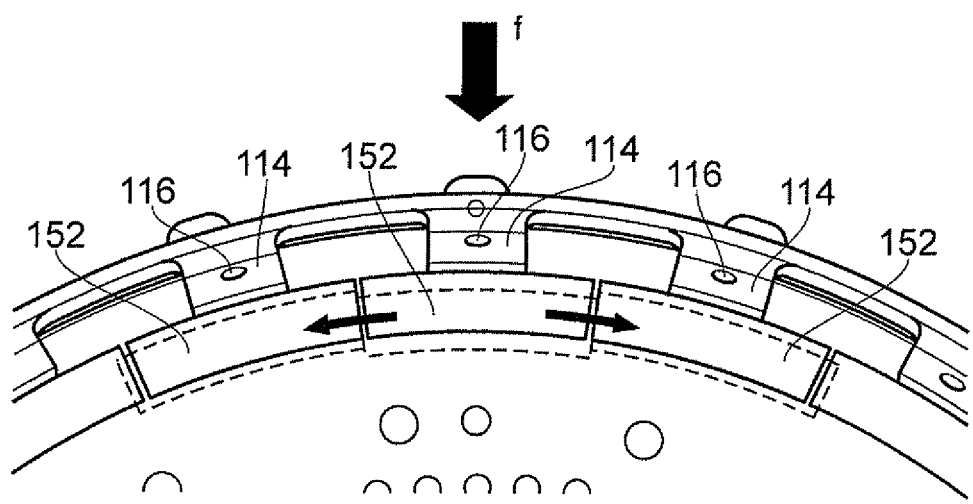
FIG. 10 is a partial view of the support ring of FIG. 9 in use.

In another alternative embodiment, illustrated in FIGS. 8 to 10, the load spreader 122 may comprise a deep front flange 150 integrally formed with the flexible fingers 114 of the support ring 106. The flange 150 provides high stiffness and resistance to bending from impact loads. In order to ensure the flexible fingers 114 remain flexible, and are not so constrained by the flange 150 that they cannot deflect to accommodate tolerances in the attachment between nose cone 104 and support ring 106, the flange 150 is split into discrete sections 152, as best illustrated in FIGS. 9 and 10. The splits in the flange 150 allow each flexible finger 114 to move independently and accommodate tolerances. When a large deflection from a bird impact is seen, the flexible fingers 114 in the path of the deflection move radially inwards (downwards as indicated by arrow F in FIG. 10). The small gap between sections 152 of the flange 150 means that only a small deflection in one section 152 can be experienced before the section 152 engages neighbouring sections 152. This effect means that the load from the impact is distributed into more flexible fingers 114 around the support ring 106, reducing the load seen by any one finger 114.

It will be appreciated that in all of the above disclosed embodiments, the nose cone 104 and support ring 106 operate as a combined system to accommodate and distribute impact forces. By designing for deflection within both the nose cone 104 and the support ring 106, a light weight yet highly impact resistant nose cone assembly 102 is provided. The design affords no aerodynamic penalties, such as are experienced when elliptical fixation holes are presented to the air flow in prior art designs.

The present invention does not require the standard, heavy fixation flange that is provided on existing nose cones, and as such allows for a simpler nose cone design of reduced thickness. This thinner shell type structure carries a reduced risk of delamination and thermal cracking both between layers and within layers. The simpler structure also allows for automated lay up and manufacture of the nose cone, reducing cost compared to the hand lay up procedures currently required.

The support ring of the present invention is also simple to manufacture from aluminum alloy. Expensive heavier metals such as are used on fully rigid support ring designs are not required. The design of the present invention allows aluminum to be used without exceeding the strain limit of the material, as part of a robust impact resistant design.

The invention claimed is:

1. A nose cone assembly comprising
a nose cone and a support ring, the nose cone is mounted on the support ring;
wherein the support ring comprises a plurality of circumferentially distributed resilient attachment tabs, via which the nose cone is mounted on the support ring, the support ring further comprises a load spreader, wherein the load spreader comprises a continuous ring that is coaxial with the support ring, each of the resilient attachment tabs is operably connected to the load spreader, and wherein each of the resilient attachment tabs is positioned radially outward of the load spreader.

2. A nose cone assembly as claimed in claim 1, wherein the nose cone has an internal conical surface and the internal conical surface of the nose cone is mounted directly onto the resilient attachment tabs.

3. A nose cone assembly as claimed in claim 1, wherein the resilient attachment tabs are flexible.

4. A nose cone assembly as claimed in claim 1, wherein each resilient attachment tab comprises a nut, operable to receive a bolt.

5. A nose cone assembly as claimed in claim 1, wherein the support ring comprises a continuous annular shoulder, the resilient attachment tabs project from the continuous annular shoulder on the support ring.

6. A nose cone assembly as claimed in claim 5, wherein the internal conical surface of the nose cone comprises a spigot, operable to be received on the annular shoulder of the support ring.

7. A nose cone assembly as claimed in claim 5, wherein the annular shoulder is defined between radial and axial location walls.

8. A nose cone as claimed in claim 1, wherein the load spreader comprises a sprung metallic ring.

9. A nose cone as claimed in claim 1, wherein the load spreader is selected from the group consisting of a carbon fibre disc and a glass fibre disc.

10. A nose cone assembly as claimed in claim 1, wherein each of the resilient attachment tabs comprises a recess at a free end thereof, and the load spreader is received in the plurality of recesses.

11. A nose cone assembly as claimed in claim 10, wherein the load spreader is received in the recesses with some play, such that the free end of each resilient attachment tab may displace a predetermined distance before engaging on the load spreader.

12. A nose cone assembly as claimed in claim 1, wherein the load spreader comprises an annular slotted flange formed on free ends of the resilient attachment tabs of the support ring.

13. A nose cone assembly as claimed in claim 1, wherein the nose cone comprises a composite material and the support ring comprises a metallic material.

14. A nose cone assembly as claimed in claim 13, wherein the nose cone comprises a structure selected from the group consisting of a filament wound glass fibre structure, a filament wound carbon fibre structure and a filament wound glass fibre and carbon fibre structure.

15. A nose cone assembly comprising:
a nose cone and a support ring, the nose cone is mounted on the support ring;
wherein the support ring comprises a plurality of circumferentially distributed resilient attachment tabs, via which the nose cone is mounted on the support ring, the support ring further comprises a load spreader, each of the resilient attachment tabs is operably connected to the load spreader, each of the resilient attachment tabs comprises a recess at a free end of the resilient attachment tab, each of the resilient attachment tabs is positioned radially outward of the load spreader, each recess opens radially inwardly of a respective one of the resilient attachment tabs, the load spreader is received in the recess of each of the resilient tabs and the load spreader comprises a continuous ring that is coaxial with the support ring.

16. A nose cone assembly comprising
a nose cone and a support ring, the nose cone is mounted on the support ring;
wherein the support ring comprises a plurality of circumferentially distributed resilient attachment tabs, via which the nose cone is mounted on the support ring, the support ring further comprises a load spreader, each of the resilient attachment tabs is operably connected to the load spreader, wherein each of the resilient attachment tabs comprises a recess at a free end thereof, and the load spreader is received in the plurality of recesses, and
wherein the load spreader is received in the recesses with some play, such that the free end of each resilient attachment tab may displace a predetermined distance before engaging on the load spreader.

17. A nose cone assembly comprising
a nose cone and a support ring, the nose cone is mounted on the support ring;
wherein the support ring comprises a plurality of circumferentially distributed resilient attachment tabs, via which the nose cone is mounted on the support ring, the support ring further comprises a load spreader, wherein the load spreader comprises a ring that is coaxial with the support ring and the ring comprises an annular slotted flange formed on free ends of the resilient attachment tabs of the support ring, each of the resilient attachment tabs is operably connected to the load spreader, the annular slotted flange comprises a plurality of circumferentially spaced sections, wherein a circumferential gap is provided between each pair of adjacent sections of the annular slotted flange such that the section at the free end of each resilient attachment tab may displace a predetermined distance before engaging circumferentially adjacent sections of the annular slotted flange, and wherein each of the resilient attachment tabs is positioned radially outward of the load spreader.

18. The nose cone assembly according to claim 17, wherein each section extends radially inwardly from the free end of a respective attachment tab.

* * * * *